United States Patent

Dick

[11] Patent Number: 5,803,475
[45] Date of Patent: Sep. 8, 1998

[54] RECEIVER HITCH STEP ATTACHMENT

[76] Inventor: Edward R. Dick, 9841 Old 27, Waters, Mich. 49797-0158

[21] Appl. No.: 696,351

[22] Filed: Aug. 13, 1996

[51] Int. Cl.[6] ..................................................... B60R 3/00
[52] U.S. Cl. ..................... 280/163; 280/164.1; 280/166; 280/482; 296/62
[58] Field of Search ................................ 280/163, 164.1, 280/166, 500, 482, 415.1; 296/62; 182/91, 92

[56] References Cited

U.S. PATENT DOCUMENTS

| | | |
|---|---|---|
| D. 370,452 | 6/1996 | Beasley . |
| 560,752 | 5/1896 | Prator ...................................... 280/166 |
| 3,330,577 | 7/1967 | Mills . |
| 3,716,254 | 2/1973 | Tarvin . |
| 3,730,556 | 5/1973 | Aldape et al. . |
| 3,779,580 | 12/1973 | Thelen . |
| 3,853,369 | 12/1974 | Holden . |
| 3,858,905 | 1/1975 | Peebles .................................... 280/163 |
| 3,889,997 | 6/1975 | Schoneck ................................ 280/166 |
| 4,056,270 | 11/1977 | Greenfield ................................ 182/92 |
| 4,202,562 | 5/1980 | Sorenson . |
| 4,381,069 | 4/1983 | Kreck . |
| 4,938,399 | 7/1990 | Hull et al. . |
| 5,211,526 | 5/1993 | Robinette ............................. 280/415.1 |
| 5,456,564 | 10/1995 | Bianchini . |

*Primary Examiner*—Brian L. Johnson
*Assistant Examiner*—Min Yu
*Attorney, Agent, or Firm*—Reising, Ethington, Learman & McCulloch PLLC

[57] ABSTRACT

A receiver hitch step attachment mounts to the existing receiver hitch of a pickup truck and supports a set of steps that are adjustable laterally and vertically. An auxiliary stabilizer leg is provided for engaging the ground beneath the attachment when the truck is parked in order to support the vehicle against rocking when weight is applied to the steps or when moving about in the camper.

23 Claims, 4 Drawing Sheets

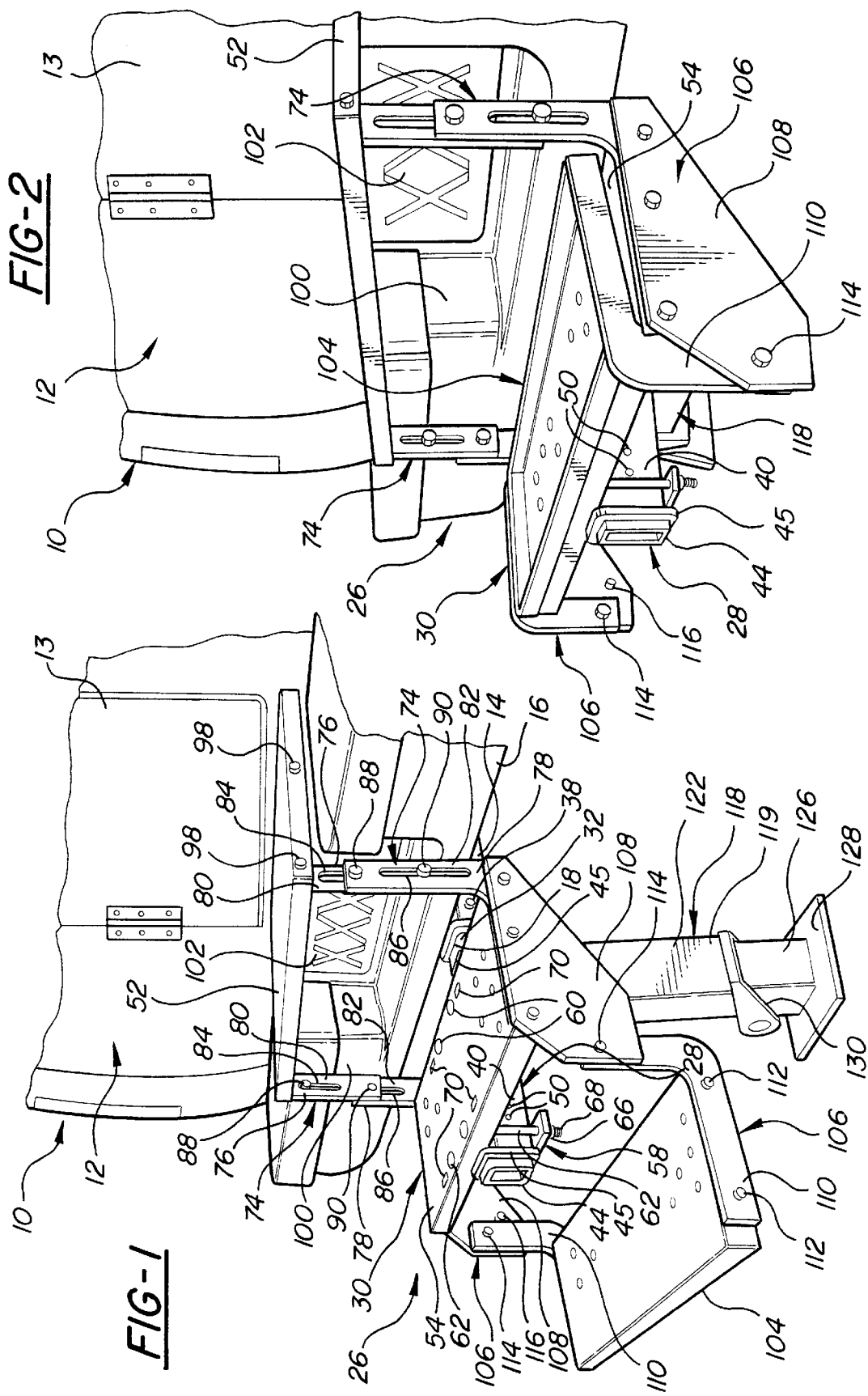

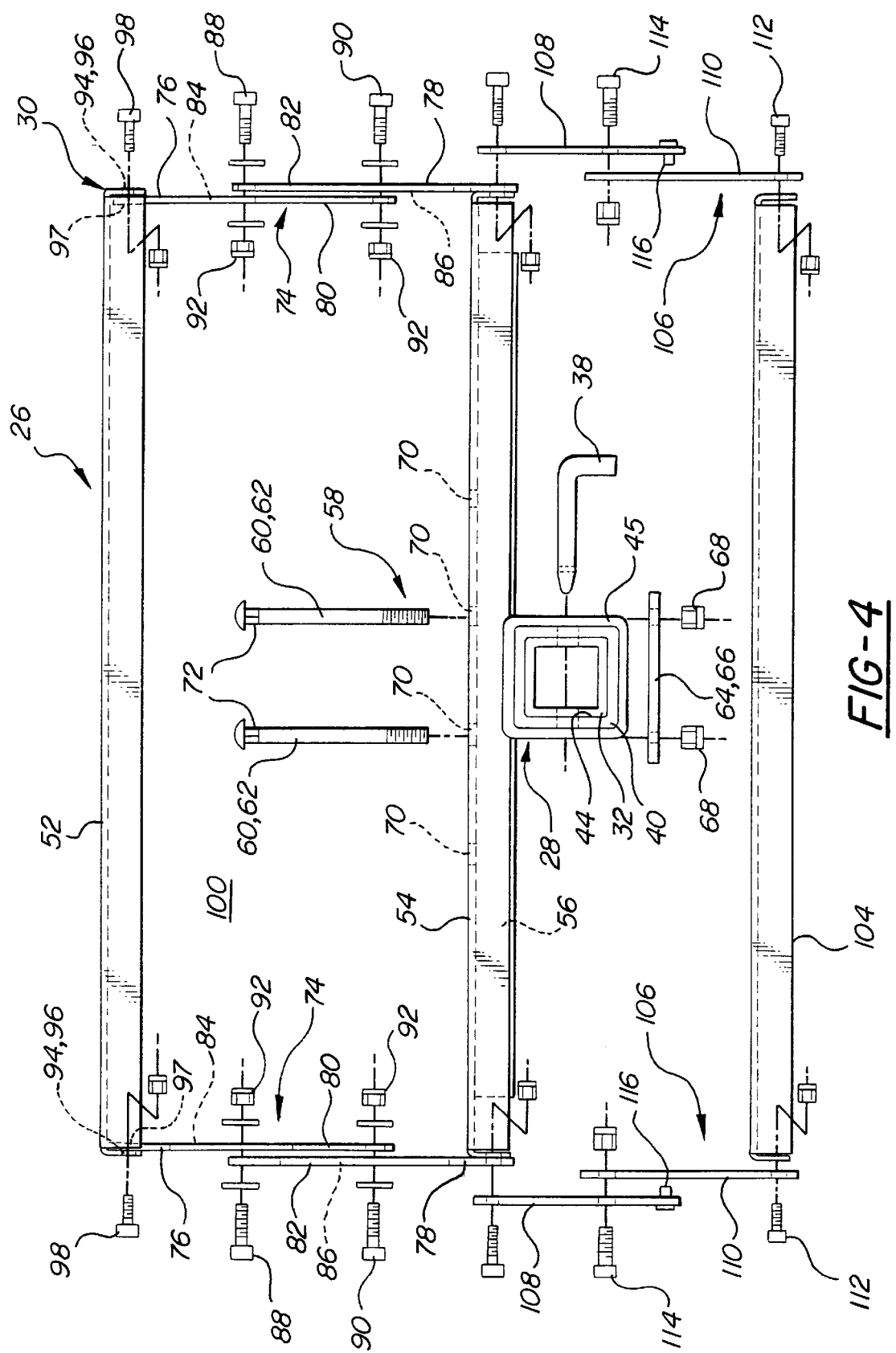

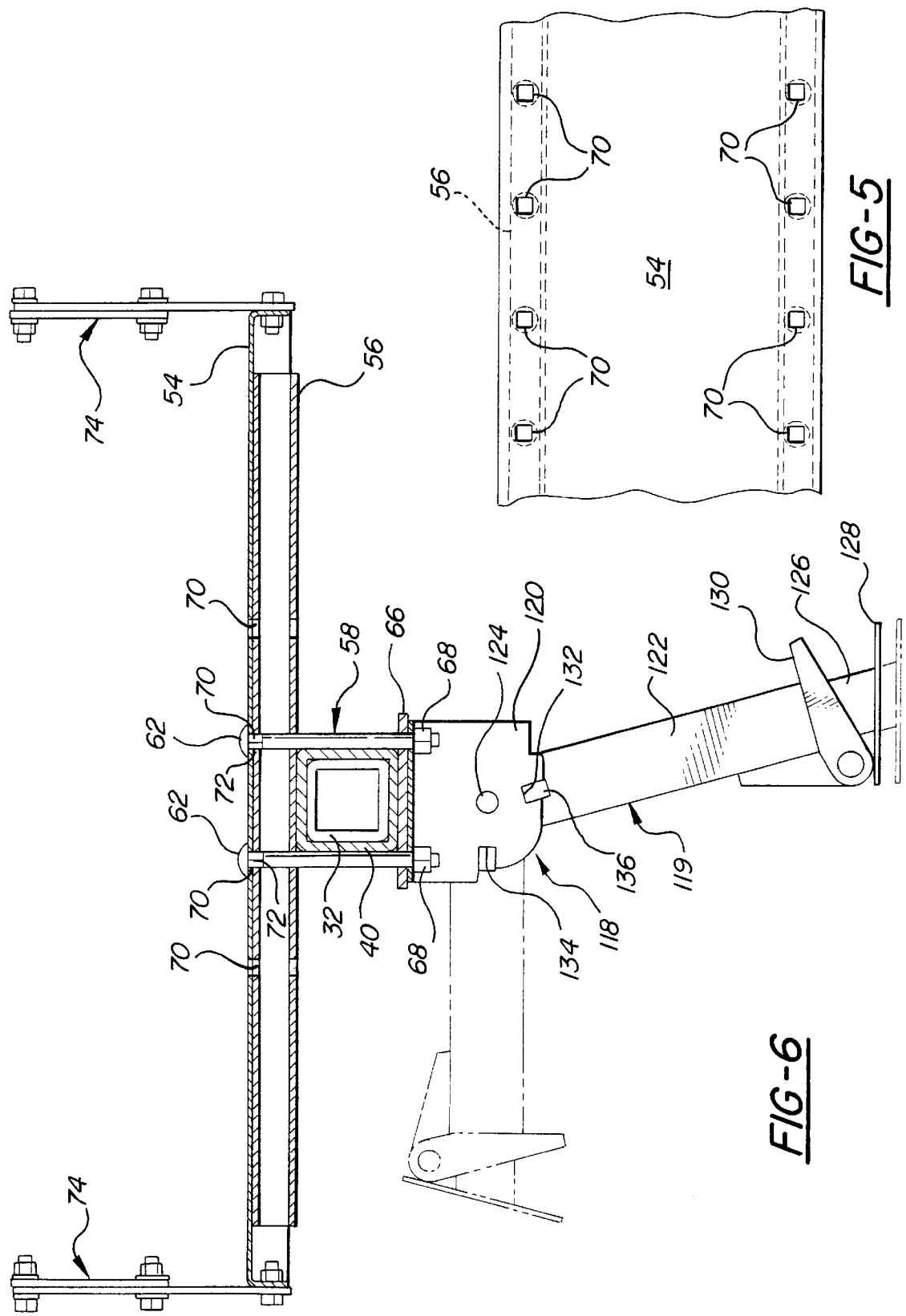

RECEIVER HITCH STEP ATTACHMENT

This invention relates to receiver hitch step attachments for existing square tubular receivers of pickup trucks, particularly those carrying truck-mounted campers, to provide access into and out of the camper or the bed of the pickup truck.

BACKGROUND OF THE INVENTION

Pickup trucks are often fitted with a square tubular receiver hitch having an open sleeve or socket for removably accommodating a drawbar hitch coupling fitted with a ball for engagement with a coupling socket of a trailer or the like.

Owners of pickup trucks who engage in outdoor activities, such as boating, snowmobiling, hunting, and the like often purchase truck-mounted campers which mount in the bed of the pickup truck for the primary purpose of leaving the receiver hitch available for towing a trailer carrying a boat, recreational vehicles, or the like, which would not be possible if a camping trailer were used instead.

One of the difficulties with truck-mounted campers is that the entrance door to the camper is typically at the level of the pickup bed, making it difficult to enter and exit the trailer. To complicate matters further, not all pickup trucks or campers are made alike such that the height of the bed may vary greatly from one truck to another as may the location of the door which, in most campers, is centrally located but in others may be offset to the right or left side of the trailer.

SUMMARY OF THE INVENTION

A receiver hitch step attachment according to the invention comprises an elongate drawbar whose leading end is slidable into engagement with the existing receiver of a pickup truck. Its opposite trailing end is configured to support a hitch coupling for releasably engaging a hitch coupling of a trailer. The attachment includes at least an upper and lower step and connecting structure joining the steps to the drawbar and to one another in such manner as to permit adjustment of the steps laterally relative to the drawbar and vertically relative to one another.

Such an attachment has the advantage of providing steps for entering and exiting a truck-mounted camper while retaining usage of the existing receiver via the open socket trailing end of the drawbar to permit towing a trailer when the attachment is mounted in the receiver. The connecting structure for the steps accommodates variations in the designs of different pickups and campers enabling the steps to be shifted laterally relative to the drawbar to align with a door of a camper that is offset from center. The vertical adjustment of the steps accommodates variations in the height of the pickup bed and the relative height of the existing receiver among different truck designs.

According to still a further feature, a fold down third step is provided which is coupled pivotally to the lower step and is moveable between a use position in which the third step is arranged below the lower step and a stowed position in which the third step is folded upon the lower step. This third step is particularly useful when the elevation of the pickup bed is quite high, making it more convenient to get into and out of the camper.

According to still a further feature, the drawbar mounts a stabilizer leg which swings down from a stowed position and engages the ground beneath the attachment device when the truck is parked so as to support the truck against bouncing when stepping onto the steps or moving about in the camper.

THE DRAWINGS

These and other features, advantages and objects of the present invention will become more readily understood to those skilled in the art when considering the connection with the following detailed description and accompanying drawings, wherein:

FIG. 1 is a perspective view showing the step attachment mounted on a vehicle with the third step and stabilizer leg moved to their use positions;

FIG. 2 is a view like FIG. 1 but showing the third step and stabilizer leg moved to their stowed positions;

FIG. 4 is a rear elevational exploded view of the attachment;

FIG. 5 is a fragmentary plan view of the lower step; and

FIG. 6 is a fragmentary rear elevational view showing features of the stabilizer unit.

DETAILED DESCRIPTION

Figure 3:
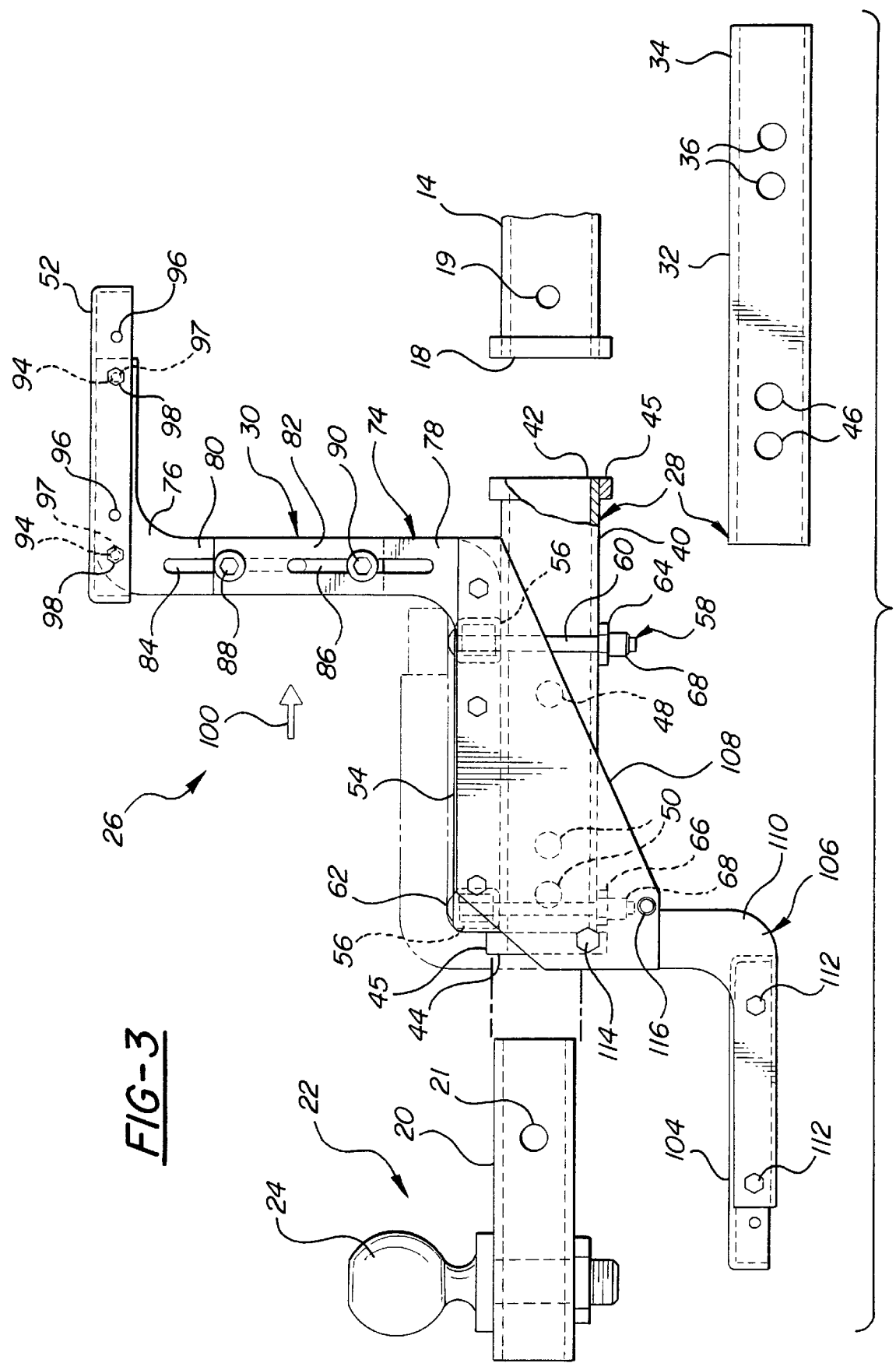
FIG. 3 is a side elevational partially exploded view of the hitch attachment.

FIG. 1 shows a conventional pickup truck vehicle 10 having a camper unit 12 with door 13 mounted in the bed of the truck in known manner. The vehicle 10 is equipped with a conventional receiver hitch 14 comprising a square tubular sleeve rigidly secured to the underside of the vehicle frame beneath the rear bumper 16, presenting a rearwardly opening socket 18. Traditionally, the socket 18 receives a tongue 20 of a conventional hitch coupling 22. The tongue 20 is secured in the socket 18 in known manner by a latch pin or the like, which is extended through aligned holes 19, 21 in the walls of the socket 18 and tongue 20. A coupling ball 24 is mounted on the trailing end of the tongue 20 for engagement with a corresponding coupling socket (not shown) of a trailer hitch in known manner.

According to the invention, the hitch coupling 22 is replaced by a receiver hitch step attachment 26 comprising an elongate drawbar 28 mounting an adjustable step assembly 30.

As shown best in FIG. 3, the drawbar 28 comprises an elongate extension piece 32 of preferably square tubular material having a leading end 34 that is sized for insertion into the open socket 18 of the existing receiver hitch 14 of the truck 10 in the same manner as the tongue 20 of the hitch coupling 22. The leading end 34 has at least one and preferably two or more longitudinally spaced sets of mounting holes 36 that are alignable selectively with the mounting holes 19 of the socket 18 when the leading end 34 is inserted to differing depths into the socket 18 to permit releasable connection of the extension piece 32 to the hitch 14 by means of a conventional latch pin 38 or the like. A trailing portion 40 of the extension piece 32 extends rearwardly of the hitch 14. The amount by which the extension piece 32 extends beyond the hitch 14 can be varied depending on which set of mounting holes 36 the latch pin 38 is installed.

The drawbar 28 has an elongated adaptor sleeve 40 supported by the extension piece 32. This sleeve 40 is fabricated preferably of square tubular material open at opposite leading 42 and trailing 44 ends thereof and sized to accept insertion of the extension piece 32 into the leading end 42. The open trailing end 44 defines a secondary receiver socket like that of the hitch 14 for receiving and the tongue 20 of the conventional type hitch coupling 22 into the trailing end 44. Reinforcement collars 45 are provided at both ends of the sleeve 40 for strength.

As illustrated in FIG. 3, the trailing end of the extension piece 32 is provided with at least one and preferably two or more sets of longitudinally spaced mounting holes 46 which align with an associated set of mounting holes 48 of the sleeve 40 to permit releasable connection of the sleeve 40 to the extension piece 32 by means of a conventional latch pin like that of latch pin 38 mentioned above. The multiple mounting holes 46 enable the longitudinal position of the sleeve 40 to be adjusted relative to the extension piece 32 in the same way that the mounting holes 36 provide adjustment of the extension piece 32 relative to the receiver hitch 14. The trailing end 44 of the sleeve 40 is constructed in the same general manner as the existing receiver hitch 14 on the truck 10 so that it can mount the hitch coupling 22 without requiring any modification thereof. The trailing end 44 includes at least one and preferably two sets of mounting holes 50 that align with the mounting holes 21 on the tongue 20 to permit releasable connection of the hitch coupling 22 to the sleeve 40 by means such as a latch pin like that described previously at 38. The multiple holes 50 permit some amount of longitudinal adjustment in the position of the hitch coupling 22 relative to the sleeve 40 depending upon which set of mounting holes 50 the latch pin 38 is accommodated in.

While a particular preferred construction of the drawbar 28 is described above in which the extension piece 32 and adaptor sleeve 40 are separate components and adjustable relative to one another, the invention contemplates a construction whereby the extension piece 32 is fixed, such as by welding to the sleeve 40, with the fore and aft adjustment of the drawbar 28 being provided by the multiple mounting holes 36 alone.

Turning now to further description of the step assembly 30, there is provided at least an upper step 52 and a lower step 54 joined by connecting structure to one another and to the drawbar 28 in such manner to permit the steps 52, 54 to be adjusted laterally in position relative to the drawbar 28 and vertically relative to one another. The steps 52, 54 are each rectangular in shape and formed preferably from metal plate material having downwardly bent flanges about the perimeters thereof defining front, back, and left and right side walls of the steps. The lower step 54 is reinforced by a pair of tubular cross members 56 secured to the underside of the step 54 adjacent the front and back edges of the step 54 and extending lengthwise of the step but terminating short of the downwardly turned side walls of the step 54.

The connecting structure includes a central mounting bracket, generally indicated at 58, provided for coupling the lower step 54 to the adaptor sleeve 40 in a manner to permit lateral adjustment in the position of the lower step 54 and hence the entire step assembly 30 relative to the sleeve 40. The preferred mounting bracket 58 includes front and back sets of carriage bolts 60, 62, associated front and back retaining straps 64, 66, and nut and washer assemblies 68 for each of the bolts.

As shown best in FIG. 5, the lower step 54 is formed with sets of laterally spaced mounting holes 70 adjacent the leading front and trailing back edges of the step 54 and associated aligned holes 71 passing through the cross members 56. Preferably the holes 70 of each set are equally spaced from one another by a distance slightly greater than the width of the adaptor sleeve 40. The mounting holes 70 are preferably square in shape to receive a correspondingly-squared neck 72 of the carriage bolts 60, 62 to secure them against rotation.

As shown in FIGS. 3 and 4, the lower step 54 is supported crosswise on the upper surface of the adaptor sleeve 40 and secured in place by passing the carriage bolts 60, 62 through selected ones of the mounting holes 70 such that the bolts 60, 62 straddle the opposite sides of the sleeve 40. Threaded ends of the bolts 60, 62 extend through correspondingly spaced holes in the retaining straps 64, 66 arranged beneath the sleeve 40 and are secured by tightening the nut and washer assemblies 68 against the straps 64, 66 to draw the step 54 tightly against the sleeve 40. It will be apparent from FIGS. 4 and 5 that the positioning of the step 54 can be shifted laterally left or right of center depending upon which mounting holes 70 are selected. When the step 54 is mounted in laterally offset relation to the sleeve 40, the cross members 56 provide added support to the step 54 to keep it from flexing or bending under load.

Vertically adjustable side bracket assemblies 74 join the upper step 52 to the lower step 54 at its opposite left and right lateral ends and enable its position to be adjusted vertically relative to the lower step 54. The bracket assemblies 74 comprise sets of upper and lower L-shaped brackets 76, 78 secured to the downwardly turned left and right side walls of the upper 52 and lower 54 steps, respectively. The brackets 76, 78 have vertical leg sections 80, 82 that overlap and are formed with vertically elongated adjustment slots 84, 86. Adjustment bolts 88, 90 are fixed on the end of each of the legs 80, 82 and each extends through the upper and lower slots 84, 86 of the opposing adjacent leg. This double bolt and slot arrangement enables the upper bracket 76 and hence the upper step 52 to be adjusted vertically relative to the lower step 54 while supporting the upper step 52 against fore and aft rocking movements relative to the lower step 54, maintaining the upper step 52 generally parallel to the lower step 54. The adjustment bolts 88, 90 have nut and washer assemblies 92 which are threaded onto the bolts and tightened in order to retain the upper step 52 in a selected position of vertical adjustment relative to the lower step 54.

As shown best in FIG. 3, the side walls of the upper step 52 preferably have two sets of laterally spaced mounting holes 94, 96 that align with mounting holes 97 of the upper brackets 78 to permit attachment of the upper step 52 to the brackets 76 by suitable fasteners 98. The multiple sets of mounting holes 94, 96 permit fore and aft adjustment in the position of the upper step 52 relative to the lower step 54 depending upon which set of mounting holes are employed. FIG. 3 shows the upper step 52 secured in forwardmost position relative to the lower step 54.

It will be seen from FIGS. 1, 2 and 4 that the side bracket assemblies 74 support the upper and lower steps 52, 54 in such manner as to frame a generally rectangular window or open space between the steps 52, 54 that is substantially unobstructed when viewed from behind the vehicle 10. This is an important feature since in most cases the license plate 102 of the vehicle will be mounted centrally on the bumper 16 and will not be blocked from view when the attachment 26 is mounted on the receiver hitch 14 because of the provision of the open space or window 100 between the steps 52, 54.

The step attachment 26 may further include a third foldable step 104 constructed in substantially the same manner as the upper step 52. The third step 104 is pivoted to the lower step 54 by left and right hinge bracket assemblies 106. The assemblies 106 comprise left and right fixed brackets 108 secured to the step 54 providing downwardly projecting flange portions. L-shaped left and right pivoting brackets 110 are provided having one leg secured to the left and right side walls of the third step 104 by fasteners 112 in the same manner as the upper step 52, including the provision of multiple mounting holes for adjusting the fore and aft position of the third step 104 relative to the lower step 54.

The other leg of the L-shaped brackets 110 are coupled to the fixed bracket 108 by hinge pins 114. The assemblies 106 permit the third step 104 to pivot between an operative use position (shown in FIG. 1 and in solid lines in FIG. 3) in which the lower step is supported below and rearwardly of the step 54, and an inoperative folded or stowed position (shown in FIG. 2 and in broken chain lines in FIG. 3), in which the step 104 is swung upwardly and rests generally flush upon the lower step 54. As is apparent from FIG. 2, the hinge bracket assemblies 106, like the side bracket assemblies 74, leave the space between the steps generally open and unobstructed, so as to permit attachment of the hitch coupling as well as to maintain a substantially unobstructed view of the vehicles license plate 102 between the upper and lower steps 52, 54 when the third step 104 is folded to its stowed position.

The fixed brackets 108 mount stop pins 116 that project inwardly to engage the pivoting brackets 110 when the step 104 is swung downwardly in order to support the step 104 in the use position.

The step attachment 26 may further include a stabilizing unit 118 supported by the drawbar 28 for movement between an operative use position (shown in FIG. 1 and in solid lines in FIG. 6) in which an adjustable length leg 119 of the unit 118 extends downwardly and engages the ground beneath the step attachment 26, and an inoperative stowed position (shown in FIG. 2 and in broken chain lines in FIG. 6), in which the leg 119 is supported out of engagement with the ground. The preferred stabilizer unit is one manufactured by Atwood, Product No. 82301 (ref. Coast-to-Coast Catalog 1996). This preferred unit 118 includes a generally U-shaped mounting bracket or base 120 supporting the adjustable length leg 119. The leg 119 includes an upper sleeve section 122 coupled to the bracket 120 by pivot pin 124 and a lower extendable telescoping section 26 supported slidably within the sleeve 122 and carrying a foot 28 at its free end for engaging the ground. A foot-operated jacking device 30 acts between the upper and lower sections 122, 126 for adjusting the effective length of the leg.

As shown in FIG. 6, the bracket 120 has notches 132, 134 which selectively receive a spring latch 136 carried by the sleeve section 122 to lock the leg 119 in either the downwardly extended use position or the upwardly folded stowed position.

The bracket 120 is attachable to either set of the carriage bolts, but preferably is mounted to the forward most set 60 and preferably such that the adjustable leg 119 extends laterally to one side of the sleeve 40 when in the stowed position as shown in the drawings, rather than lengthwise of the sleeve 40. Further, it is preferred that the leg 119 not extend outwardly beyond the side of the step 54 when stowed and the unit 118 is so selected with this in mind.

In use, the user determines the requirements for the lateral positioning of the step assembly 30 relative to the extension bar 28 based upon the particular truck on which the attachment 26 is to be installed as well as the design of the camper unit 12, and namely the location of the door 13. The step assembly 30 may be centered as shown in the drawings, or may be offset laterally to one side or the other of the sleeve in order to provide access, for example, to a camper 12 whose door 13 is not centered on the camper 12.

The requirements for the vertical positioning of the upper step 52 are also determined for the particular application and the side bracket assemblies 74 are adjusted accordingly. The appropriate fore and aft positioning of the upper step 52 on its bracket 76 is also determined and the step 52 mounted accordingly. The extension piece 32 is then slid into the receiver hitch 14 and fore and aft adjustment of the unit 26 is made relative to the vehicle 10 so as to locate the upper step 52 over the rear bumper 16 beneath the camper door 13, as shown in FIGS. 1 and 2. The fore and aft positioning of the unit 26 may be adjusted by alignment of a selected set of the multiple mounting holes 36 of the extension piece 32 with those of the receiver hitch 14. If necessary, additional adjustment can be obtained in similar manner via alignment of selected ones of the mounting holes of the extension piece 32 and the adaptor sleeve 40. Once positioned, latch pins 38 are extended through the aligned mounting holes to secure the step attachment 26 releasably in position on the receiver hitch 14.

In the event a trailer is to be towed, the third step 104 and stabilizer unit 118 are swung to their stowed positions, as illustrated in FIG. 2 and the hitch coupling 22 is joined to the adaptor sleeve 40 for connection with a corresponding socket-type hitch coupling (not shown) of the trailer.

When the truck 10 is parked and with the trailer unhooked, the step 104 may be swung down to its use position shown in FIGS. 1 and 3 and the leg 119 of the stabilizing unit 118 is locked in its downwardly extended position. The jacking device 130 may then be operated to extend the foot 128 of the adjustable leg 119 into firm engagement with the ground beneath the step attachment 26. When so positioned, a person is able to enter and exit the camper 12 with ease and the stabilizing unit 118 supports the truck 10 against bouncing or rocking when weight is applied to the step assembly 30 or when moving about in the camper 12.

The disclosed embodiment is representative of a presently preferred form of the invention, but is intended to be illustrative rather than definitive thereof. The invention is defined in the claims.

I claim:

1. A receiver hitch step attachment for a vehicle having an existing tubular receiver hitch, said attachment comprising:
   an elongate drawbar having a leading end slidable into supporting engagement with the existing receiver hitch of the vehicle and an opposite trailing end configured to support a hitch coupling releasably engageable with a mating hitch coupling of a trailer;
   at least an upper step and a lower step; and
   connecting structure connecting said steps to said drawbar and to one another and enabling lateral adjustment of said steps relative to said drawbar and vertical adjustment of said steps relative to one another.

2. The receiver hitch step attachment of claim 1 wherein said connecting structure includes a laterally adjustable central mounting bracket interconnecting said lower step and said drawbar.

3. The receiver hitch step attachment of claim 2 wherein said connecting structure includes a plurality of laterally spaced mounting holes provided in said lower step, said mounting bracket being engageable with selected ones of said mounting holes to secure said steps in a corresponding selected position of lateral adjustment relative to said drawbar.

4. The receiver hitch step attachment of claim 3 wherein said mounting holes are squared and said mounting bracket includes carriage bolts having correspondingly squared necks receivable in said squared mounting holes of said lower step.

5. The receiver hitch of claim 4 wherein said lower step includes two sets of said laterally spaced mounting holes provided adjacent leading and trailing edges of said lower step and said mounting bracket includes at least pairs of said carriage bolts straddling opposite sides of said drawbar.

6. The receiver hitch step attachment of claim 5 wherein said mounting bracket includes retaining straps extending beneath said drawbar and engaging said carriage bolts.

7. The receiver hitch step attachment of claim 1 wherein said connecting structure includes vertically adjustable side bracket assemblies joining said steps together along opposite lateral sides thereof.

8. The receiver hitch step attachment of claim 7 wherein said steps and said side brackets frame a generally unobstructed open space between said steps when viewed lengthwise of said drawbar.

9. The receiver hitch step attachment of claim 7 wherein said side bracket assemblies include a pair of lower brackets fixed on said lower step adjacent its opposite lateral sides and a corresponding pair of upper brackets fixed on said upper step adjacent its laterally opposite sides, and a vertically adjustable connection joining said upper bracket to said lower bracket.

10. The receiver hitch step attachment of claim 9 wherein said vertically adjustable connection comprises vertically elongate slots and adjustment bolts accommodated for sliding movement along said slots.

11. The receiver hitch step attachment of claim 1 wherein said upper step is supported for fore and aft adjustment relative to said lower step.

12. The receiver hitch step attachment of claim 1 including a foldable third step coupled pivotally to said lower step and movable between an operative use position below said lower step and an inoperative folded position upon said lower step.

13. The receiver hitch step attachment of claim 12 including hinge bracket assemblies secured to said lower step and said foldable third step adjacent opposite lateral edges of said steps.

14. The receiver hitch step attachment of claim 13 including stops provided on said hinge bracket assemblies to support said foldable step in said use position.

15. The receiver hitch step attachment of claim 13 wherein said upper and said lower steps define a generally unobstructed open space therebetween through which a license plate of the vehicle may be seen when said step attachment is secured to the receiver hitch of the vehicle, said open space remaining substantially unobstructed when said foldable step is positioned in said folded position on said lower step.

16. The receiver hitch step attachment of claim 1 wherein said drawbar includes a square tubular sleeve portion having an open trailing end defining a secondary receiver socket for mounting a conventional hitch coupling, said drawbar including an elongate extension piece secured at one end within said leading end of said sleeve portion and projecting to a forward free end thereof slidable into supporting engagement with the existing receiver hitch of the vehicle.

17. The receiver hitch step attachment of claim 16 wherein said free end of said tongue portion includes a plurality of longitudinally spaced attachment holes selectively alignable with corresponding attachment holes of the receiver hitch of the vehicle for receiving a locking pin to secure said tongue in a selected position of longitudinal adjustment.

18. The receiver hitch step attachment of claim 16 wherein said sleeve slidably supports said extension piece enabling adjustment in the effective length of said drawbar, said one end of said extension having a plurality of longitudinally spaced mounting holes selectively alignable with a set of mounting holes provided on said leading end of said sleeve, and a locking pin extending through said selectively aligned mounting holes to secure said extension piece in a selected position of longitudinal adjustment relative to said sleeve.

19. The receiver hitch step attachment of claim 1 including a stabilizing device having an adjustable length leg supported by said extension bar for movement between a use position in which said leg extends downwardly to engage the ground beneath said step attachment for providing stability to the vehicle when parked, and a stowed position in which said leg is supported above the ground.

20. A receiver step attachment for a vehicle having a square tubular receiver that is open to define a socket for normally slidably accommodating a conventional hitch coupling, said attachment comprising:

an adjustable length drawbar having a leading end and an opposite trailing end, said leading end being receivable slidably into the receiver socket of the vehicle to vary the effective length of said drawbar extending beyond the receiver, said leading end including a plurality of longitudinally spaced sets of mounting holes alignable with mounting holes of the receiver to accommodate a locking pin for securing said drawbar releasably to the receiver in a selected position of length, said trailing end of said drawbar having an open ended tubular construction defining a secondary receiver socket for mounting the hitch coupling;

a step assembly including at least an upper step and a lower step each extending transversely of said extension bar between opposite lateral sides thereof;

a pair of side bracket assemblies joining said upper step to said lower step adjacent said lateral sides thereof defining an opening between said steps and said brackets that is generally unobstructed, said side brackets providing a vertical adjustment enabling the position of said upper step to be adjusted vertically relative to said lower step; and a central mounting bracket interconnecting said lower step and said drawbar and providing lateral adjustment in the position of said steps relative to said drawbar.

21. The receiver hitch step attachment of claim 20 wherein said step assembly includes a third foldable step pivoted to said lower step for movement between a use position in which said third step is supported below of said lower step and a stowed position in which said third step is disposed on top of said lower step.

22. The receiver hitch step attachment of claim 21 including a stabilizer unit having an adjustable length leg supported by said drawbar for movement between a use position in which said leg extends downwardly to engage the ground beneath said attachment and a stowed position in which said leg is supported out of engagement with the ground.

23. A receiver step attachment for a vehicle having a tubular receiver, said attachment comprising:

a drawbar having a leading end slidable into supporting engagement with the receiver of the vehicle and a trailing end having an open ended tubular configuration defining a secondary receiver socket for mounting a conventional hitch coupling;

at least one step mounted on said drawbar; and a stabilizer unit having an adjustable length leg supported by said drawbar for movement between a stabilizing position in which said leg extends downwardly to engage the ground beneath said attachment and a stowed position in which said leg is supported out of engagement with the ground.

\* \* \* \* \*